United States Patent Office 3,681,293
Patented Aug. 1, 1972

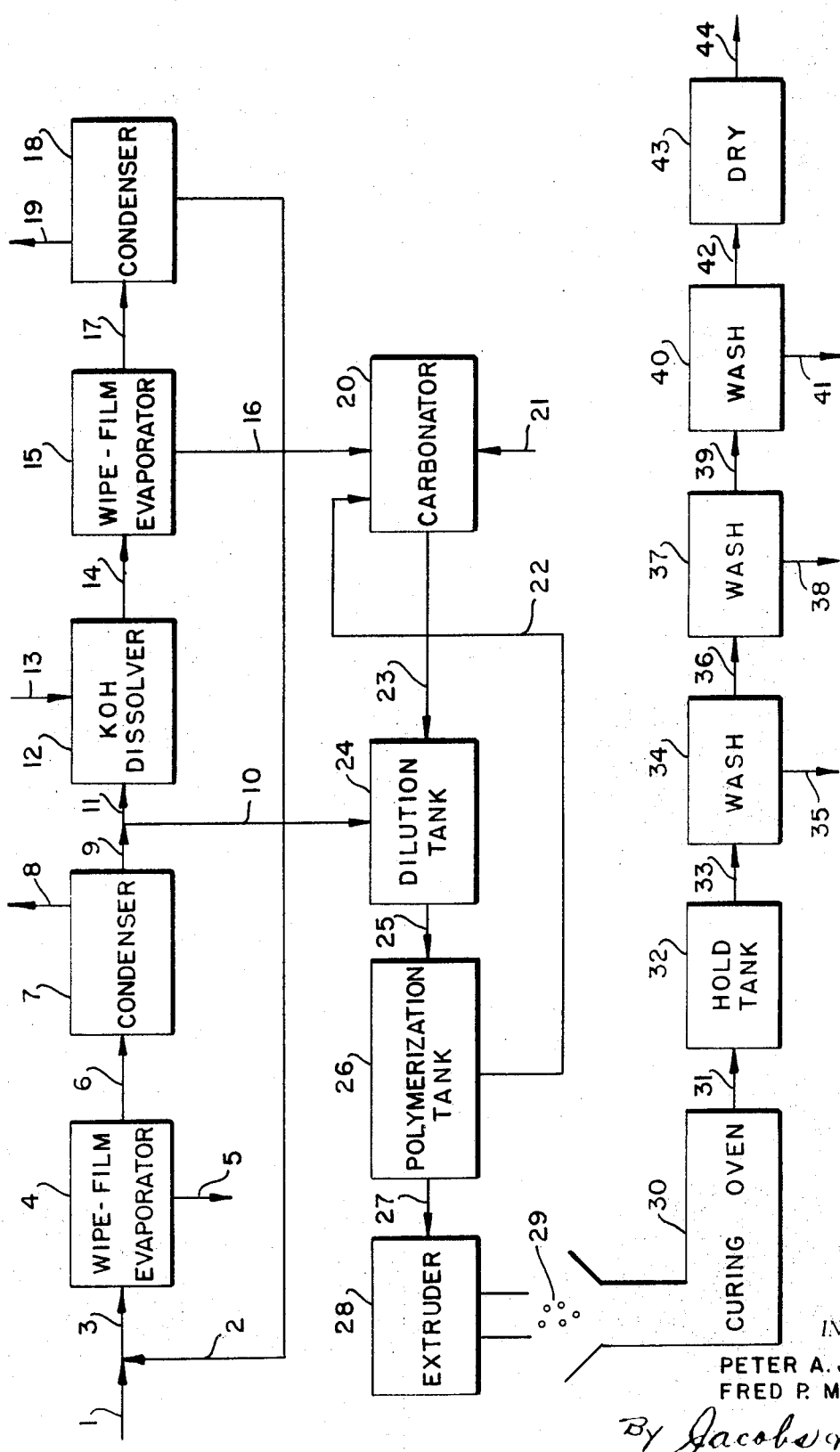

3,681,293
CONTINUOUS POLYMERIZATION OF 2-PYRROL-IDONE WITH CARBON DIOXIDE AS ACTIVATOR
Peter A. Jarovitzky and Frederick L. Maynor, Stamford, Conn., assignors to Radiation Research Corporation, Stamford, Conn.
Filed Sept. 3, 1970, Ser. No. 69,330
Int. Cl. C08g 20/18
U.S. Cl. 260—78 P
7 Claims

ABSTRACT OF THE DISCLOSURE

A continuous process for the polymerization of 2-pyrrolidone, wherein the pyrrolidone is purified by distillation under vacuum, the purified pyrrolidone is divided into two parts, one part being reacted with an alkali metal hydroxide to form the alkali metal salt of 2-pyrrolidone, the mixture of 2-pyrrolidone and alkali metal salt thereof is contacted with carbon dioxide, the carbonated reaction mass is admixed with the second portion of the purified 2-pyrrolidone, the thus diluted, carbonated reaction mass is polymerized to a controlled extent and the partially polymerized mass is extruded into pellets, the pellets being cured, and freed of unreacted monomer and impurities to provide a final product comprising the pellets of 2-pyrrolidone.

---

This invention relates to the polymerization of 2-pyrrolidone.

Methods for the polymerization of 2-pyrrolidone to form polypyrrolidone have been previously disclosed, for example, in U.S. Pats. 2,638,463, 2,809,958 and 2,891,038. In general, these methods involve the polymerization of 2-pyrrolidone in the presence of an alkaline polymerization catalyst, and, usually, with an activator as well.

The polymer formed from 2-pyrrolidone is believed to be a linear polyamide, which has come to be known as nylon-4, having the structure:

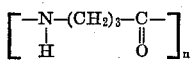

The polymer may be shaped into ribbons, films, molded articles and fibers. Because of its hydrophilic properties, which closely resemble those of cotton and silk, nylon-4 fibers has long been recognized as having great commercial potential. For example fabrics made from nylon-4, in contrast with other presently available synthetic fibers, are as readily dyed as cotton; they may be ironed at cotton temperatures; they rapidly dissipate static charges; and, in particular, they possess the comfort of cotton and wool.

Nylon-4 fiber has never been made commercially, however, primarily because efforts to manufacture the fiber by the economical melt spinning method have met with almost universal failure. In the copending application of Carl E. Barnes, Serial No. 763,898, filed Sept. 30, 1968, entitled "Polymers of 2-Pyrrolidone," now abandoned and in the continuation-in-part application thereof Ser. No. 69,471 filed Sept. 3, 1970, there is disclosed and claimed novel polymers of 2-pyrrolidone that can be converted into useful shaped articles, such as fibers, filaments, rods, bristles, films, ribbons and the like, by the inexpensive method of melt extrusion.

The polymers of 2-pyrrolidone of the aforesaid Barnes applications exhibit a marked increase in heat stability as compared to prior art polymers, which is particularly important in the formation of fibers by melt extrusion.

The aforesaid Barnes applications disclose that the new nylon-4 polymers can be prepared by polymerizing 2-pyrrolidone using an alkaline polymerization catalyst in the presence of $CO_2$. For example, polymerization can be effected by bubbling $CO_2$ through a mixture of 2-pyrrolidone and an alkali metal salt of 2-pyrrolidone, e.g. sodium or potassium pyrrolidonate, the alkali metal pyrrolidonate functioning as an alkaline polymerization catalyst, and then polymerizing the carbonated mixture.

The new polymer of the Barnes applications can also be prepared by reacting $CO_2$ with the alkali metal salt of 2-pyrrolidone to form an adduct of $CO_2$ and the alkali metal pyrrolidonate, and then polymerizing the 2-pyrrolidone monomer in the presence of the adduct.

The specific details of the formation of the new nylon-4 using $CO_2$ can be found in the aforementioned Barnes applications, and therefore the polymerization procedure will only be briefly discussed herein. The reaction conditions for the polymerization of 2-pyrrolidone in the presence of $CO_2$ are essentially the same as that already described in the prior art. In general, 2-pyrrolidone monomer may be polymerized at a temperature from about 18° C. to about 100° C., preferably 25° C. to 70° C., and most preferably 25° C. to 60° C., under a pressure ranging from subatmospheric to superatmospheric in the presence of the alkaline polymerization catalyst. Bulk polymerization or suspension polymerization can be used. A technique using an anhydrous non-solvent, such as hydrocarbon, is suitable, as described in U.S. Pat. 2,739,959.

The catalyst may be any alkaline catalyst for polymerizing 2-pyrrolidone, such as those disclosed in previously mentioned U.S. Pat. 2,638,463, except that the alkali metals or any other agent that may reduce the sensitive 2-pyrrolidone ring thereby introducing impurities which may be harmful to the polymerization reaction are not use. Suitable catalysts are derivatives of the alkali metals, e.g. the hydrides, hydroxides and oxides of the alkali metals. The alcoholates of the alkali metals, such as sodium methylate, or a quaternary ammonium base as described in U.S. Pat. 2,973,343 of the formula:

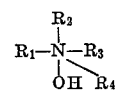

wherein $R_1$, $R_2$ and $R_3$ are lower alkyl radicals and $R_4$ is an alkyl, aryl or aralkyl radical, may be used with good results. The aforesaid Barnes applications provide a complete description of the large number of alkaline polymerization catalysts that can be used.

The catalyst may be used in an amount of 0.5 to 50% by weight, based on the 2-pyrrolidone monomer, preferably 5 to 30 wt. percent, most preferably 8 to 20 wt. percent.

The preferred proportion of $CO_2$ and polymerization catalyst is about 2 mols of the catalyst per mol of $CO_2$. The temperature at which the $CO_2$ is added to the catalyst may be varied widely, good results having been obtained at temperatures ranging from 18° C. (approximately the freezing point of the solution of the catalyst in monomer) to 130° C. or higher.

Suitably, the 2-pyrrolidone monomer will be contacted with 0.01 to 10 wt. percent of $CO_2$, based on the weight of the 2-pyrrolidone monomer. Presently preferred amounts are 0.2 to 6 wt. percent, based on the weight of the 2-pyrrolidone, while 0.5 to 5 wt. percent are the most preferred amounts.

The amount of carbon dioxide can also be expressed as a mol percent of the mols of alkaline polymerization catalyst. The amount of carbon dioxide would thus be from about 0.06 to 60 mol percent, based on the mols of the alkaline polymerization catalyst, but higher amounts, e.g. up to about 80 mol percent $CO_2$ based on the mols of alkaline polymerization catalyst have been used. Generally, the amount of $CO_2$ on a molar basis will be from 10 to 80 mol percent, based on the mols of alkaline polymerization catalyst.

It is possible to introduce $CO_2$ into the system other than by bubbling $CO_2$ into the mixture of 2-pyrrolidone and alkaline polymerization catalyst. For example, the source of $CO_2$ can be a compound that will transfer $CO_2$ to the mixture of 2-pyrrolidone monomer and alkaline polymerization catalyst, provided that an anion remaining after loss of $CO_2$ from the compound is not deleterious to the polymerization. Adducts of carbon dioxide and an alkali metal or quaternary ammonium pyrolidonate can be added to a mixture of 2-pyrrolidone monomer and alkaline polymerization catalyst, as can adducts of $CO_2$ and an alkali metal or quarternary ammonium caprolactamate, with or without any $CO_2$ gas added to the system. These adducts are added to the system on the same weight basis as the $CO_2$.

A convenient method for preparing the adducts is to bubble $CO_2$ through an anhydrous mixture of the pyrrolidonate and 2-pyrrolidone under vacuum until there is a sharp rise in pressure indicating that the $CO_2$ is no longer being readily absorbed. The adduct is precipitated by adding benzene or other organic precipitant to the solution. There is recovered from the precipitate a free-flowing, non-hygroscopic, white powder. Alternatively, the organic precipitant can be added to an anhydrous solution of pyrrolidonate in 2-pyrrolidone before the $CO_2$ is bubbled through the solution, in which case the precipitate forms as the $CO_2$ is absorbed.

Since it is necessary to react $CO_2$ with anhydrous pyrrolidonate, it is preferred to form the $CO_2$-pyrrolidonate adduct by adding $CO_2$ to an anhydrous solution of pyrrolidonate in 2-pyrrolidone, where the pyrrolidonate is formed in situ as described above.

In a similar manner, the adduct of $CO_2$ and caprolactamate is formed by bubbling $CO_2$ through an anhydrous solution of caprolactamate in caprolactam and adding the organic precipitant before or after the $CO_2$ addition. Generally, when the caprolactamate is formed in situ, temperatures in excess of 90° C. are avoided.

While it is preferred to utilize the polymerization catalyst with carbon dioxide as the sole polymerization activator, other polymerization activators may be used in conjunction with carbon dioxide, such as the acyl compounds discussed in previously mentioned U.S. Pat. 2,809,958, or any of the activators mentioned in U.S. Pats. 2,912,415; 3,016,366; 3,022,274; 3,028,369; 3,033,831; 3,040,004; 3,042,659; 3,060,153; 3,061,593; 3,069,392; 3,135,719; 3,148,174; 3,158,589; 3,174,951; 3,180,855; and 3,210,324.

When it is desired to use one of these activators along with $CO_2$, acetyl pyrrolidone, adipyl dipyrrolidone or phenylisocyanate are preferred. When employed, the activator may be used in an amount of 0.001 to 25% by weight, based on the 2-pyrrolidone monomer, preferably 0.01 to 5 wt. percent, most preferably 0.1 to 3 wt. percent.

It is desirable to carry out the polymerization in the substantial absence of water, although anhydrous conditions are not essential; e.g. the amount of water should not exceed about 0.1% by weight of the 2-pyrrolidone monomer.

It is usually desirable to provide a continuous polymerization process and it is the object of the present invention to provide a continuous process for the polymerization of 2-pyrrolidone, and specifically a continuous process for the polymerization of 2-pyrrolidone in the presence of carbon dioxide. The present invention finds particular utility in the polymerization of 2-pyrrolidone using the technique of the aforesaid Barnes applications wherein the alkaline polymerization catalyst is formed in situ by reacting the 2-pyrrolidone monomer with a compound that will form an ammonium, alkali metal or alkaline earth metal salt of pyrrolidone. Particularly preferred is the use of potassium hydroxide to form potassium pyrrolidonate as the alkaline polymerization catalyst.

Briefly, the present invention resides in a continuous process for the polymerization of 2-pyrrolidone wherein 2-pyrrolidone monomer is distilled under vacuum in a vessel equipped for the evaporation of 2-pyrrolidone in the form of a thin film, the vapors of the thus purified 2-pyrrolidone are condensed and a first portion of the condensed vapors is separated and admixed with an ammonium, alkali metal, or alkaline earth metal hydroxide to form the corresponding salt of 2-pyrrolidone, and the pyrrolidone salt and monomer mixture thus formed are heated under vacuum in a vessel equipped for heating said mixture in the form of a thin film to remove water formed by the reaction between the 2-pyrrolidone and the hydroxide. In order to insure that all of this water is removed, it is desirable to distill over a small amount of the 2-pyrrolidone monomer.

The mixture of 2-pyrrolidone monomer and salt of 2-pyrrolidone is then carbonated by intimate contact with dry carbon dioxide gas. In a preferred embodiment of this invention, a particulate material is present during the carbonation. This particulate material can be provided by recycling to the carbonation vessel a small portion of the polymer from the polymerization vessel. Alternatively, the particulate material can be added from a separate source and can be carbon black, etc. Details concerning the use of a particulate material in the polymerization of 2-pyrrolidone in the presence of carbon dioxide can be found in the copending application of Peter A. Jarovitzky, Ser. No. 69,496, filed Sept. 3, 1970, entitled Polymerization of 2-Pyrrolidone."

The carbonated reaction mass is then passed to a dilution tank where the remaining portion of the purified 2-pyrrolidone monomer is mixed with the carbonated reaction mass. In general, the mixture of monomer and salt thereof in the carbonation vessel has a molar ratio of 2-pyrrolidone to salt thereof of from 1:1 to 4:1, and the carbonated mixture is mixed with an amount of 2-pyrrolidone in the dilution tank to provide a molar ratio of 2-pyrrolidone to salt thereof of at least 9:1. It is desirable to use as large an amount as possible of 2-pyrrolidone in the dilution tank with respect to the salt thereof and molar ratios of 2-pyrrolidone to salt thereof from 9:1 to 20:1 may be used. The details of this dilution technique, whereby the carbon dioxide is added to a concentrated mixture of monomer and salt thereof and the mixture after carbonation is diluted with a large quantity of monomer, can be found in the copending application of Peter A. Jarovitzky, Ser. No. 69,495, filed Sept. 3, 1970, entitled "Improved Process for the Polymerization of 2-Pyrrolidone," filed concurrently herewith. The Jarovitzky applications Ser. Nos. 69,495 and 69,496 are hereby incorporated herein by reference.

The thus diluted carbonated mixture is then passed to a polymerization vessel maintained at atmospheric pressure and any convenient temperature. A temperature of 50° C. has been found to be suitable. The polymerizing mixture is held in the polymerization vessel for a time merely sufficient for the mixture to become sufficiently viscous so that it can be extruded through a perforated plate into a tubular shape which is rapidly cut by a knife to form a plurality of pellets. The extrusion device is maintained at the same temperature and pressure as the polymerization tank. The still polymerizing pellets are then passed through a curing oven also maintained at the same temperature and pressure as the polymerization tank, the total time of the polymerizing mass in the polymerization vessel, the extrusion device and the curing oven being sufficient to provide the desired conversion of monomer to polymer. Generally, a convenient range for this conversion would be from 50 to 70 percent, but higher or lower conversions can be obtained, if desired. The cured pellets are sent to a holding tank until sufficient pellets are accumulated to be sent to a series of washes.

In order to remove unreacted monomer, catalyst and any impurities that may have been formed, the cured pellets are subjected to three washings. The first washing is with cold water, for example at a temperature of 20°–35° C., until the polymer has a pH of 7. This washing removes unreacted 2-pyrrolidone monomer and virtually all of the water-soluble materials. The wet and now neutral pH polymer is slurried with acid, at a solids content of from 10 to 30 percent, at room temperature. Solids contents of less than 10 percent generally will be inefficient, and solids contents greater than 30 percent will form a slurry that could be too thick to handle conveniently. The acid employed in this washing is not critical, and suitable acids are hydrochloric acid and acetic acid. The washing with acid is continued until the acidified polymer has a pH of 4.5. Generally, it will be found that the pH of the polymer will measure 4.5, but will gradually rise with time. Accordingly, the standard employed herein to determine that the polymer has reached a stable pH is to slurry a sample of 10 grams of polymer with 90 grams of water for 10 minutes and to measure the pH of this sample. If the pH of the sample remains constant for 15 minutes, then the pH of the polymer is considered to be stable. The acid washing is intended to remove difficultly removable materials, presumably of a basic nature. After the acid washing, the polymer is then washed with water, at any suitable temperature, to remove all traces of the acid. When this washing is with water at about 80° to just below 100° C., the washing time is reduced and the polymer particles are denser than if the washing is with water at 25°–30° C. The washing is complete when the pH of the polymer is 7. After the final washing, the polymer is dried under vacuum at a temperature of 150° C. or less.

The present invention is illustrated by the accompanying drawing which is a schematic representation of the process.

A preferred embodiment of the invention is illustrated by the accompanying drawing as follows.

865 lbs. of commercial grade 2-pyrrolidone monomer is admitted through line 1, and is joined by 65 lbs. of 2-pyrrolidone recycled through line 2. The mixture of fresh and recycled pyrrolidone amounting to 930 lbs. is passed through line 3 to a wiped-film evaporator 4 of any suitable design. A wiped-film evaporator operates by spreading a thin film of the liquid to be evaporated upon a heated surface. Suitable wiped-film evaporators are commercially available through many suppliers, for example the Chemetron Company. The wiped-film evaporator 4 is operated at a temperature of 80 to 100° C. at a vacuum of 1 to 10 mm. of mercury. The temperature is not critical and it is simply desired to boil the pyrrolidone at as low a temperature as possible. The actual temperature employed will depend on the vacuum drawn on the wiped-film evaporator. In the specific embodiment described herein, wiped-film evaporator 4 is operated at a temperature of 80° C. under a vacuum of 1 mm. of mercury. 910 lbs. of 2-pyrrolidone vapor are removed from the wiped-film evaporator 4 through line 6 and are sent to condenser 7, while 20 lbs. of high boiling materials are discarded through line 5. The high boiling materials boil at a temperature greater than 80° C.

Condenser 7 is operated at any convenient temperature, and a suitable range of temperatures is from 30 to 50° C. at a pressure of 1 to 10 mm. of mercury. Condenser 7 is operated in the preferred embodiment described herein at a temperature of 40° C. and a pressure of 1 mm. of mercury. Condenser 7 acts to condense the 2-pyrrolidone vapors, and 905 lbs. of liquid are removed from condenser 7 through line 9. Low boiling materials are vented through line 8 and amount to 5 lbs. The liquified pyrrolidone removed through line 9 is split into two portions, a portion amounting to 395 lbs. being passed through line 11 to a potassium hydroxide dissolver 12, and a second portion amounting to 510 lbs. is passed to dilution tank 24, to be described hereinafter. Potassium hydroxide is admitted to the potassium hydroxide dissolver through line 13, and it has been found convenient to use potassium hydroxide pellets of 85 percent assay. These pellets contain 85 percent potassium hydroxide, 13 percent potassium carbonate, and 2 percent water, all by weight. 66 lbs. of the potassium hydroxide pellets are admitted to the potassium hydroxide dissolver 12 through line 13. The dissolver is operated at any convenient temperature and pressure, and accordingly atmospheric pressure is generally employed. Potassium hydroxide dissolves well in pyrrolidone at 80° C., but generally the higher the temperature the more impurities are formed. These impurities are of unknown composition but tend to impair the polymerization. Consequently, it is preferred to use a temperature less than 80° C., and dissolver 12 is operated at a temperature of 70° C. at a pressure of 1 atmosphere. The mixture of potassium hydroxide and 2 - pyrrolidone amounting to 461 lbs. is passed through line 14 to a wiped-film evaporator 15 of the same type as wiped-film evaporator 4. As in the case of wiped-film evaporator 4, the wiped-film evaporator 15 is also operated under vacuum at as low a temperature as possible, and generally a temperature in the range of 80 to 100° C. at a pressure of 1 to 10 mm. mercury will be employed. Wiper-film evaporator 15 is operated at a temperature of 80% C. at a pressure of 1 mm. mercury. There is removed through line 17 from the wiped-film evaporator a mixture of water and 2-pyrrolidone mounting to 75 lbs. While theoretically it is possible to operate the wiped-film evaporator 15 such that only the water formed by the reaction between 2-pyrrolidone and KOH is removed, in order to insure that all of the water is removed, the wiped-film evaporator 15 is operated so that a mixture of water and 2-pyrrolidone is removed. Condenser 18 is operated in the same way as condenser 7, and in particular it is operated at a temperature of 40° C. and a pressure of 1 mm. mercury. Water vapor amounting to 10 lbs. is vented through line 19, and 65 lbs. of 2-pyrrolidone is recycled from condenser 18 through line 2 to line 3.

386 lbs. of a mixture of 2-pyrrolidone and the potassium salt of 2-pyrrolidone is removed from wiped-film evaporator 15 through line 16 and is passed to the carbonator 20. The mixture passed through line 16 into carbonator 20 contains 4 moles of 2-pyrrolidone per mole of KOH added through line 13 to the system. This molar ratio has been found to be quite effective in providing increased polymerization rates and/or higher molecular weight polymer than if molar ratios of 2-pyrrolidone to KOH in excess of 4:1 were employed in carbonator 20. See the disclosure in the aforesaid Jarovitzky application Ser. No. 69,496 entitled "Improved Process for the Polymerization of 2-Pyrrolidone." Dry carbon dioxide gas is introduced into carbonator 20 through line 21 in the amount of 22 lbs. A small amount of already polymerized polymer is recycled from polymerization tank 26 through line 22 to the carbonator 20, and in the embodiment illustrated herein, this amount is 7 lbs. The recycled polymer enables the carbonation to proceed in the presence of a particulate material added externally. See the aforesaid Jarovitzky application Ser. No. 69,496 entitled "Polymerization of 2 - Pyrrolidone." If desired, recycle line 22 can be dispensed with entirely. Alternatively, a particulate material can be added from an external source, such as carbon black, through a line not shown.

The carbonated reaction mass amounting to 415 lbs. is withdrawn from carbonator 20 through line 23 and introduced into the dilution tank 24, where it is admixed with an additional quantity of 2-pyrrolidone amounting to 510 lbs. which is passed into the dilution tank 24 through line 10. The diluted mixture is passed from the dilution tank through line 25 to polymerization tank 26, which is maintained at a temperature of 50° C. and atmospheric pressure, as is dilution tank 24. Carbonator 20 while maintained at a temperature of 50° C. is under a pressure of 5 p.s.i.g. supplied by the carbon dioxide. Any suitable pressure can be maintained in carbonator 20. Both the carbonator 20 and the dilution tank 24 are conveniently provided with a stirring device.

The mixture in the polymerization tank is retained in the tank for a time sufficient to achieve about 20 percent conversion, for example about 6 hours. The degree of conversion in polymerization tank 26 is not critical and a sufficient degree of polymerization is obtained so that the mass leaving through line 27 can be easily formed into pellets 29 in the extruder device 28. Polymerization tank 26 can suitably take the form of a plug flow reactor wherein the polymerizing mass is moved through the reactor by means of a screw device.

Extruder 28 also takes the form of a screw extruder having a perforated outlet. The reaction mass is extruded through the perforated plate as a plurality of strings, which can be rapidly cut as they are formed so as to provide a plurality of pellets 29. The precise means by which the reaction mass is converted into pellets is not essential to the invention, and any suitable means may be used. The pellets 29 are passed to a curing oven 30, the residence time in the polymerization tank 26, extruder 28 and curing oven 30 being sufficient to provide the desired degree of conversion. The polymerization tank 26, extruder 28 and curing oven 30 are all maintained at atmospheric pressure and a temperature of 50° C. Generally, the rate of polymerization tends to decrease at conversions above about 50 percent. Accordingly, the precise degree of conversion will be determined by the size of the equpiment, the nature of the monomer recovery unit, and the general overall economics of the system. In the embodiment illustrated herein, the percent conversion is about 65 percent.

The cured pellets are removed from the curing oven 30 through line 31 and amount to 918 lbs. The cured pellets are passed to a holding tank 32 until sufficient quantity of pellets are obtained to pass through the wash cycles. In the embodiment described herein, the entire contents of the whole tank amounting to 918 lbs are passed directly through line 33 to wash tank 34.

The washing starts with wash tank 34, and involves the use of cold water, at a temperature of from 20 to 35° C. In the illustrated embodiment, the temperature of the wash water is 30° C. The washing in wash tank 34 removes virtually all of the monomer and virtually all of the water-soluble impurities. Excluding the wash water itself, the monomer and water-soluble impurities removed through line 35 amount to 320 lbs. When the washed polymer in wash tank 34 has a pH of 7, it is removed through line 36 and introduced into wash tank 37 where the wet polymer is washed with a suitable acid, such as hydrochloric acid, until the polymer achieves a stable pH of 4.5. Generally, only a small amount of impurities is removed by means of the acid washing, and in the illustrated embodiment, 8 lbs. of impurities are removed through line 38.

The acid washed polymer is removed through line 39 and passed into wash tank 40, where it is contacted with water to remove the acid from the polymer. The washing with water is continued until the polymer has a stable pH of 7. This final washing also removes a small amount of impurities, and in the illustrated embodiment, 8 lbs. of impurities are removed through line 41.

The term "stable pH" is defined herein as a pH that remains constant for 15 minutes, the pH measurement being taken on a sample of 10 grams of polymer and 90 grams of water that has been slurried together for 10 minutes. The final washed polymer is removed through line 42 and amounts to 582 lbs. This washed polymer is dried in dryer 43 and the dry polymer is removed through line 44 at a moisture content of less than about 1 percent by weight. The dryer 43 is operated at a temperature of 100°–130° C. under a vacuum of ≤5 mm. of mercury, and it is preferred to use the maximum vacuum possible.

While the invention may be carried out as described above, variations can be made within the scope of the claims appended hereto. For example, the KOH added in line 13 can be in the form of an alcoholic solution of KOH prepared by dissolving KOH in the minimum amount of alcohol necessary. Methanol or other lower alcohol can be used. The solution of KOH and alcohol is cooled to the temperature of the KOH dissolver 12, if necessary. Methanol or other lower alcohol can be used. The solution of KOH and alcohol is cooled to the temperature of the KOH dissolver 12, if necessary. Evaporator 15 will remove the methanol from the system and the methanol can be vented through line 19.

Furthermore, evaporator 15 can actually be two evaporators, with the first evaporator being operated at 60° to 80° C. to remove 80–90% of the water and the second evaporator being operated at 80–100° C. to remove the last traces of water. In this way, any hydrolysis of the 2-pyrrolidone by KOH and water will be minimized because there will be only a small amount of water in the system when the 2-pyrrolidone is heated to the higher temperatures.

What is claimed is:

1. A method for the continuous polymerization of 2-pyrrolidone to form a solid polymer, comprising the following steps, in combination, effected in a continuous manner:
   (a) passing 2-pyrrolidone liquid in a form of a thin film through a distillation zone maintained at conditions of elevated temperature and vacuum sufficient to distill 2-pyrrolidone vapor from said liquid 2-pyrrolidone and removing 2-pyrrolidone vapor from said zone;
   (b) condensing the 2-pyrrolidone vapor removed from (a) in a zone maintained under vacuum, and removing liquid 2-pyrrolidone from said condensing zone;
   (c) admixing a first portion of said liquid 2-pyrrolidone with an ammonium, alkali metal, or alkaline earth metal hydroxide to form the corresponding salt of 2-pyrrolidone, the ammonium, alkali metal, or alkaline earth metal hydroxide being added in an amount less than the stoichiometric amount necessary to convert all of the 2-pyrrolidone into said salt;
   (d) heating the solution of 2-pyrrolidone and salt thereof removed from (c) in the form of a thin film in an evaporation zone maintained at conditions of elevated temperature and vacuum sufficient to remove water formed during the reaction between said 2-pyrrolidone and said hydroxide;
   (e) passing the solution of 2-pyrrolidone and salt thereof freed from water to a carbonation zone wherein said solution is contacted with carbon dioxide as a polymerization activator;
   (f) admixing the carbonated reaction mass with a second portion of the liquefied 2-pyrrolidone removed from (e);
   (g) polymerizing the diluted, carbonated reaction mass for a time sufficient to achieve partial polymerization;
   (h) extruding the partially polymerized reaction mass removed from (g) into pellets; and
   (i) curing said pellets.

2. The process according to claim 1, wherein the evaporation zones (a) and (d) are maintained at a temperature of between about 80° C. and 100° C. at a pressure of from 1 to 10 mm. Hg.

3. The process according to claim 1, wherein said mixture of 2-pyrrolidone and salt thereof is in the molar ratio of from 1 to 4 mols of pyrrolidone to 1 mol of said salt, and said carbonated mixture is diluted with an amount of 2-pyrrolidone in said second portion thereof to provide a diluted, carbonated reaction mass having a molar ratio of 2-pyrrolidone to salt thereof of at least 9:1.

4. The process according to claim 1, wherein a portion of the partially polymerized reaction mass removed from (g) is recycled to said carbonation zone (e).

5. The process according to claim 1, wherein a small amount of a particulate material is added to said carbonation zone (e) and is admixed with the solution of 2-pyrrolidone and salt thereof.

6. The process of claim 1, wherein said cured pellets are subjected to three washings, the first washing being with cold water until the polymer has a pH of 7, the second washing being with an acid until the polymer has a pH of 4.5 and the third washing being with water until the polymer has a pH of 7.

7. The process according to claim 1, wherein the cured pellets are washed, and the washed pellets are dried, the drying being under vacuum at a temperature of 130° C. for at least a portion of the total drying time.

References Cited

UNITED STATES PATENTS

| | | | |
|---|---|---|---|
| 2,907,755 | 10/1959 | Lautenschlager et al. | 260—78 L |
| 2,912,415 | 11/1959 | Black et al. | 260—78 P |
| 3,200,095 | 8/1965 | Wichterle et al. | 260—78 L |
| 3,488,326 | 1/1970 | Van Beveren et al. | 260—78 P |

HAROLD D. ANDERSON, Primary Examiner

U.S. Cl. X.R.

260—37 N, 78